(12) United States Patent
Klein et al.

(10) Patent No.: US 6,728,958 B1
(45) Date of Patent: Apr. 27, 2004

(54) VOLATILE RESOURCE MANAGER WITH PRE-PREPARE NOTIFICATION

(75) Inventors: Johannes Klein, San Francisco, CA (US); Albert C. Gondi, Santa Clara, CA (US); Sitaram V. Lanka, Mountain View, CA (US); William J. Carley, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/127,659

(22) Filed: Jul. 31, 1998

(51) Int. Cl.[7] .................................................. G06F 9/00
(52) U.S. Cl. ...................................................... 718/101
(58) Field of Search ................................ 709/101, 315, 709/316; 707/10, 201; 718/101

(56) References Cited

U.S. PATENT DOCUMENTS

| | | | | |
|---|---|---|---|---|
| 5,428,771 A | | 6/1995 | Daniels et al. | |
| 5,799,305 A | * | 8/1998 | Bortvedt et al. | 707/10 |
| 5,852,732 A | * | 12/1998 | Freund et al. | 709/101 |
| 5,872,969 A | * | 2/1999 | Copeland et al. | 709/101 |
| 5,924,095 A | * | 7/1999 | White | 707/10 |
| 6,029,177 A | * | 2/2000 | Sadiq et al. | 707/201 |
| 6,205,464 B1 | * | 3/2001 | Cobb et al. | 709/101 |

\* cited by examiner

*Primary Examiner*—Meng-Al T. An
*Assistant Examiner*—Li B. Zhen

(57) ABSTRACT

Methods and systems that provide a resource manager the ability to register with a transaction manager that it needs to be "pre-prepared" for a transaction. The transaction manager will issue a pre-prepare notification to any resource manager so registered, and will delay phase one of the two-phase commitment (2PC) protocol until all pre-prepare-registered resource managers have responded that they are ready for commitment processing.

29 Claims, 4 Drawing Sheets

VOLATILE RESOURCE MANAGER WITH PRE-PREPARE NOTIFICATION

BACKGROUND OF THE INVENTION

The present invention relates generally to transaction processing systems, and more particularly to techniques for preparing resource managers before phase one of the two-phase commitment (2PC) protocol commences.

A transaction most often is defined as an explicitly delimited operation, or set of related operations, that change or otherwise modify the content of an information collection (e.g., database or databases) from one consistent state to another. Changes are treated as a single unit in that all changes of a transaction are formed and made permanent (the transaction is "committed") or none of the changes are made permanent (the transaction is "aborted"). If a failure occurs during the execution of a transaction, resulting in the transaction being aborted, whatever partial changes were made to the collection are undone to leave it in a consistent state.

A transaction processing system typically includes a transaction manager; a collection of subsystems, called resource managers (RMs), which are essentially abstractions of available services, such as database systems; programming languages; user interfaces; application interfaces; and the like. The transaction processing system provides a way to interconnect applications and resource managers while maintaining data integrity and transactional consistency. In this manner, any number of database systems (e.g., DB2, Oracle, Sybase, etc.), any number of programming languages (e.g., C++, Cobol, Fortran, etc.), any number of networks (e.g., OSI, TCP/IP, etc.), any number of presentation managers (e.g., Windows, DOS, etc.), and any number of application generators (e.g., CSP, Pathmaker, Cadre, etc.) are able to interoperate to complete a transaction.

The application process initiating a transaction invokes various services and/or resource managers to perform various operations and tasks necessary to complete the transaction. All services and resource managers invoked to perform operations for the transaction register with a transaction manager, stating that they are joining the transaction. A transaction manager typically provides transaction management functions, such as monitoring the progress of the transaction and coordinating the commit processing and rollback of the transaction, and protects the integrity of user data. When all operations, or work, have completed, the initiating application process notifies the transaction manager of this fact. The transaction manager then initiates an agreement protocol to coordinate commitment processing among all services and resource managers participating in the transaction. In transaction processing the standard agreement protocol is the two-phase commitment (2PC) protocol. A description of the 2PC protocol, as well as a detailed overview of transaction processing, is presented in J. Gray et al., *Transaction Processing Concepts and Techniques*, Morgan Kauffman, 1993, the contents of which are herein incorporated by reference.

Briefly, in phase one of the 2PC protocol, the transaction manager issues a request prepare signal to each participant (i.e., the transaction manager asks each participating service or resource manager if it believes the operations it performed to be a consistent and complete transformation). If any participant votes no, the commit fails and the transaction is aborted and rolled back; if all participating resource managers vote yes (ready to commit), the transaction is a correct transformation and phase two commences. In phase two of the 2PC protocol, the transaction manager issues a commit request signal informing each participant that the transaction is complete, and records this fact in the transaction's log. After all participants acknowledge the commit request, the transaction manager records this fact and forgets about the transaction.

SUMMARY OF THE INVENTION

The present invention provides methods and systems for enhancing transaction processing systems having volatile resource managers that rely on other recoverable resource managers for their work.

In particular, the techniques of the present invention give a resource manager the ability to register with the transaction manager that it needs to be "pre-prepared" for a transaction. For example, a volatile resource manager may want to flush its cache to a recoverable resource manager. The transaction manager will issue a pre-prepare notification to any resource manager so registered, and will delay phase one of the commitment processing until all notified resource managers have responded that they are ready for commitment processing.

According to an aspect of the present invention, a transaction processing system is provided for processing a transaction initiated by an application process, wherein one or more resource managers participate in performing one or more operations for the transaction. The system typically comprises a transaction manager (TM) which coordinates a commitment processing protocol for all participating resource managers performing an operation for the transaction. All of the participating resource managers notify the TM that they are performing an operation for the transaction and that they wish to take part in the commitment processing protocol, which includes a prepare processing phase and a commit processing phase. The system also typically includes a volatile resource manager (VRM), communicably coupled to the TM, which notifies the TM that it is performing an operation for the transaction and that it desires to be notified in advance of said prepare processing phase. The TM issues a pre-prepare notification to the VRM and delays the prepare phase processing for all participating resource managers until the VRM issues a ready signal in response to the pre-prepare notification signal.

According to another aspect of the present invention, a method is provided for preparing for commitment processing of a transaction initiated by an application process in a transaction processing system having a transaction manager (TM) and one or more resource managers that participate in performing one or more operations for the transaction. The TM coordinates a commitment processing protocol for all participating resource managers performing an operation for the transaction. All of the participating resource managers notify the TM that they are performing an operation for the transaction and that they wish to take part in the commitment processing protocol, which includes a prepare processing phase and a commit processing phase. The method typically comprises the steps of: issuing a request from a volatile resource manager (VRM), which is communicably coupled to the TM, indicating that the VRM is performing an operation for the transaction and that the VRM desires notification before the prepare processing phase begins; issuing a pre-prepare notification signal from the TM to the VRM; and delaying the prepare processing phase for all participating resource managers, including the VRM, until the VRM issues a ready signal in response to the pre-prepare notification signal.

According to yet another aspect of the present invention, a method is provided for preparing for commitment processing of a transaction initiated by an application process in a transaction processing system having a transaction manager (TM) and one or more resource managers that participate in performing one or more operations for the transaction. The TM coordinates a commitment processing protocol for all participating resource managers performing an operation for the transaction. All of the participating resource managers notify the TM that they are performing an operation for the transaction and that they wish to take part in the commitment processing protocol, which includes a prepare processing phase and a commit processing phase. The method typically comprises the steps of: issuing a request from a volatile resource manager (VRM), communicably coupled to the TM, indicating that the VRM is performing an operation for the transaction and that the VRM desires notification before said prepare processing phase begins; issuing a pre-prepare notification signal from the TM to the VRM, wherein the VRM performs one or more pre-prepare operations after receiving the pre-prepare notification signal; issuing a ready signal from the VRM after the VRM has completed the one or more pre-prepare operations; and thereafter commencing the prepare processing phase of the commitment processing protocol for all participating resource managers, including the VRM.

According to a further aspect of the invention, a method is provided for preparing for commitment processing of a transaction initiated by an application process in a transaction processing system having a transaction manager (TM) and one or more resource managers that participate in performing one or more operations for the transaction. The TM coordinates a commitment processing protocol for all participating resource managers performing an operation for the transaction, wherein all of the participating resource managers notify the TM that they are performing an operation for the transaction and that they wish to take part in the commitment processing protocol, which includes a prepare processing phase and a commit processing phase. The method typically comprises the steps of: issuing a request from a volatile resource manager (VRM), communicably coupled to the TM, indicating that the VRM is performing an operation for the transaction and that the VRM desires notification before said prepare processing phase begins, wherein the VRM is located in a transaction management domain remote from the TM, the remote transaction management domain including a remote transaction manager (RTM) which coordinates the commitment processing protocol for the VRM, wherein a communication resource manager (CRM) communicably couples the TM with the remote transaction management domain; issuing a first pre-pare notification signal from the TM to the RTM; issuing a pre-prepare notification from the RTM to the VRM; and delaying the prepare processing phase for the VRM, until the VRM issues a ready signal in response to the pre-prepare notification signal.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

Figure 1:
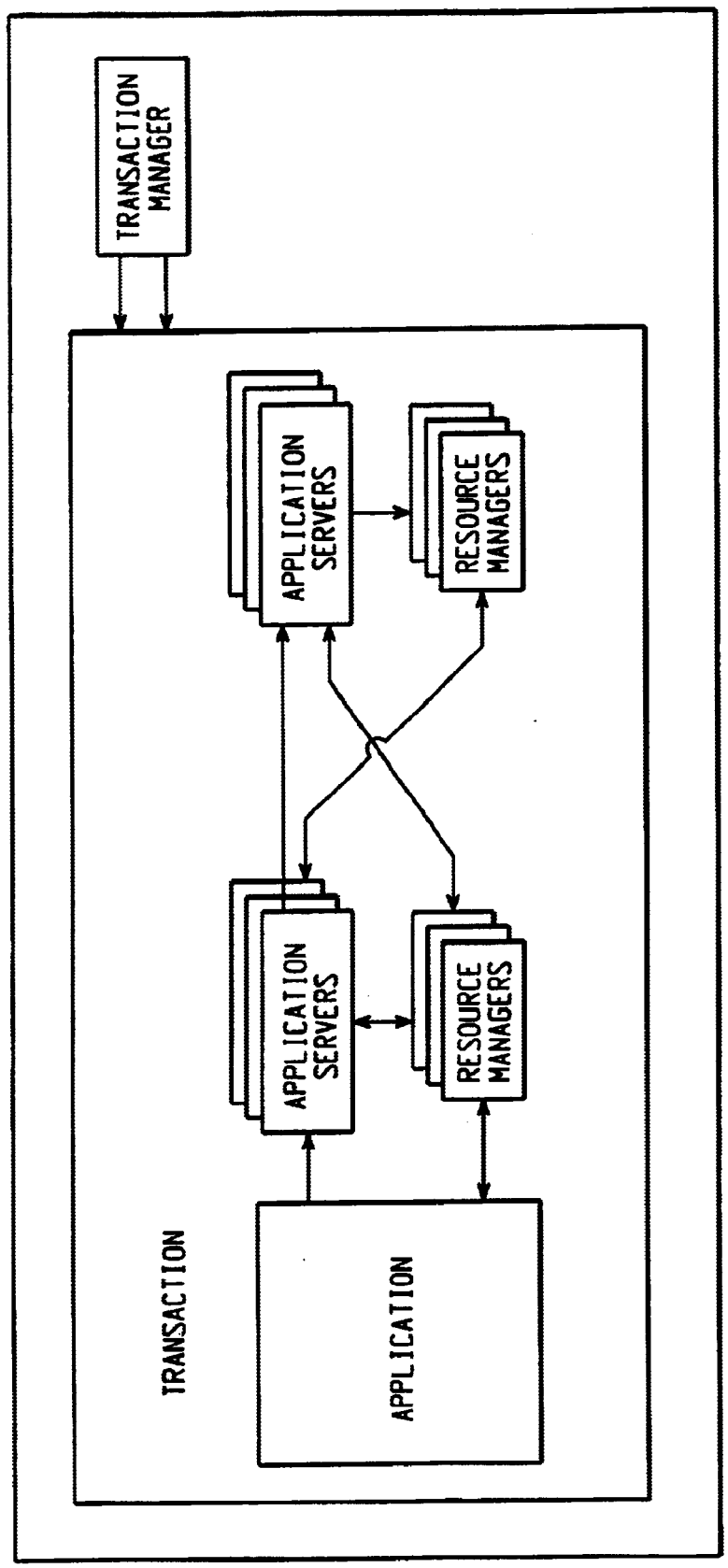
FIG. 1 illustrates a typical call structure of an application invoking various resource managers and application services to execute a transaction that is spread among application programs (clients and servers) and resource managers.

FIG. 1 illustrates a typical call structure of an application process that is invoking various resource managers and application services to execute a transaction that is spread among application programs (clients and servers) and resource managers according to the present invention. Transaction processing occurs in both centralized (local) systems and in distributed systems. The services and resource managers are invoked using local and/or remote procedure calls accordingly. Remote services and servers run in separate processes, such as on a remote computer system, while local services and servers run in the local computer system. In a centralized transaction processing system, an application process accesses services by calling one or more local resource managers using a transactional procedure call. In a distributed transaction processing system, an application process accesses services by calling one or more local resource managers, and/or one or more remote resource managers located at one or more remote processing nodes, or domains, using a transactional remote procedure call.

When an application process subcontracts part of a transaction to a foreign transaction management system it is commonly referred to as exporting a transaction branch. One or more transaction branches can be exported for a given transaction to one or more foreign transaction management systems. Similarly, a foreign transaction management system can start a transaction and subcontract part of the transaction to the local transaction management system. This is referred to as importing a transaction branch. The originator of a transaction is commonly referred to as the "superior" and the one to which part of the transaction is subcontracted to is commonly referred to as the "subordinate". It is the responsibility of the superior to initiate the agreement protocol governing commitment processing (e.g., 2PC protocol).

Figure 2:
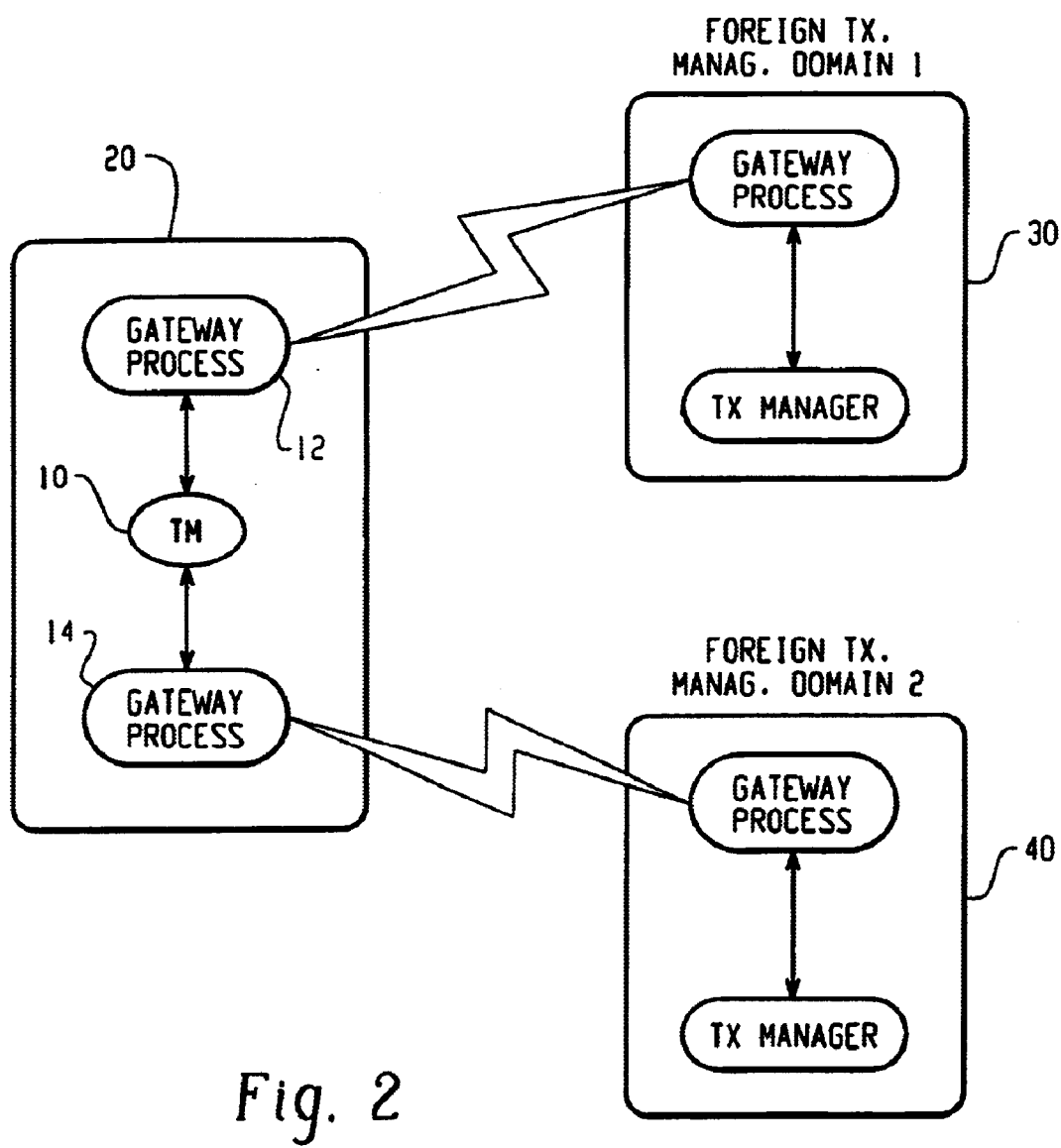
FIG. 2 illustrates the basic components of a heterogeneous transaction processing system according to the present invention.

A typical transaction management system includes an application program, one or more resource managers including a communication resource manager, and a transaction manager. The transaction manager provides transaction management functions, such as monitoring the progress of the transaction and coordinating the commit processing and rollback of the transaction, and protects the integrity of user data. The application process calls transaction services in the transaction manager to begin and end transactions. As part of a transaction, the application process accesses services by calling a local resource manager, and invokes remote services through the communication resource manager. The communication resource manager (CRM) encodes the transactional semantics of a foreign transaction management system and acts as a gateway to foreign transaction management domains. A CRM interfaces between the local transaction manager and a foreign transaction manager. The process environment in which a CRM executes is called a gateway process. The CRM exports and imports transaction branches allowing foreign transaction managers to participate in the agreement protocol with the local transaction manager. FIG. 2 illustrates the basic components of such a heterogeneous transaction processing system according to the present invention. As shown, the transaction manager 10 of local transaction management domain 20 imports and exports transactions to and from foreign transaction management domains 30 and 40 through gateway processes 12 and 14, respectively, in the communication resource manager (not shown).

Figure 3:
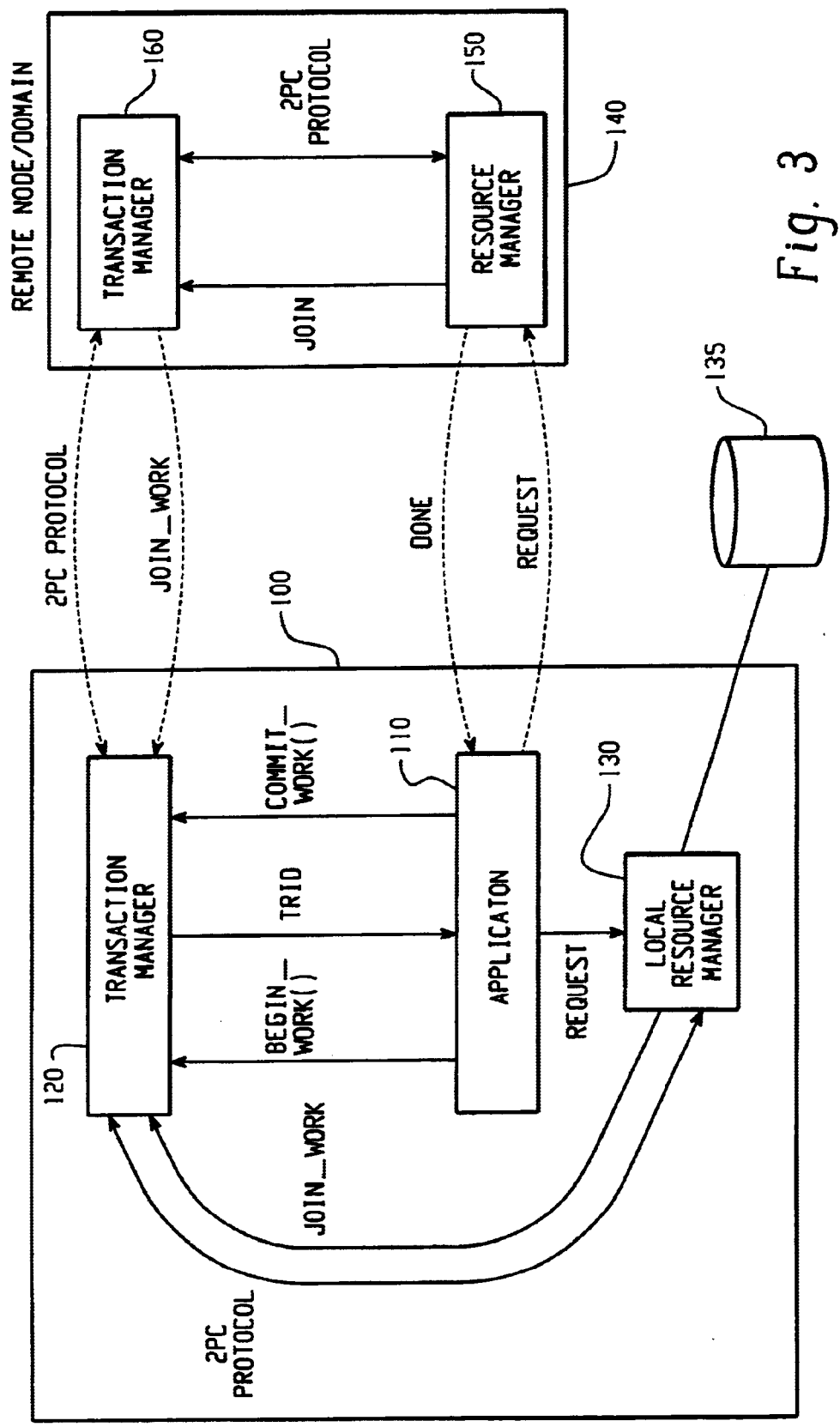
FIG. 3 illustrates the basic control flow of an application executing a transaction according to the present invention.

FIG. 3 illustrates the basic control flow of an application executing a transaction according to the present invention. When the application process 110 starts a transaction in local transaction management domain 100, it issues a Begin_Work( ) request to its associated local transaction manager 120, thereby registering the transaction with transaction manager 120. Transaction manager 120 creates a unique transaction identifier (TRID), which is used to identify that particular transaction. Once application process 110 has started the transaction (the transaction has been registered with transaction manager 120), it invokes resource managers by sending work requests to local and remote (foreign) services. Application process 110 interacts with a gateway process (not shown) to export a transaction branch to a foreign transaction management system 140. The gateway process informs transaction manager 120 of the exported transaction branch. In this manner, for each transaction started with transaction manager 120, one or more transaction branches can be exported to various foreign transaction management systems. Each exported transaction branch is given a unique transaction handle.

When a resource manager receives the first work request associated with a transaction, it joins the transaction by communicating to its local transaction manager that it wants to participate in the transaction's commitment processing (agreement protocol, e.g., 2PC protocol) and rollback operations. For example, if a request is sent to local resource manager 130, which is coupled to a service or resource 135 such as a database, local resource manager 130 registers with transaction manager 120 that it is joining the transaction; if a request is sent to remote resource manager 150, which is coupled to another resource or service, remote resource manager 150 registers with its local transaction manager 160 that it is joining the transaction. In the latter case, remote transaction manager 160 communicates (via a gateway process in each domain) with transaction manager 120 stating that it wishes to participate in the transaction's commitment processing and rollback operations on behalf of remote resource manager 150. Given a resource manager name, or ID, registering a resource manager involves creating a control block for the resource manager and inserting it on the list of control blocks.

It is typical for several resource managers to join a particular transaction. As each resource manager performs work for the transaction, it keeps a list of the changes it has made to any objects. As a rule, the old and new value of an object is recorded to a transaction log. If the transaction should fail during execution or if the transaction is aborted, transaction manager 120 orchestrates a transaction rollback. In this case, transaction manager 120 invokes each resource manager that wrote to the transaction log to undo the operation, thereby reinstating the old value of each object transformed during execution of the failed transaction.

When all work has been completed by the resource managers performing work for the transaction, a Commit_Work( ) request is issued to transaction manager 120. In response, transaction manager 120 initiates the commitment processing. In preferred aspects, the two-phase commit (2PC) protocol is used for executing the commitment processing. First, transaction manager 120 communicates with all participating resource managers that joined the transaction (including any participating remote resource managers, such as remote transaction manager 160), asking if each participating resource manager believes the transaction to be a complete and consistent transformation. If any participating resource manager votes no, the commit fails and the transaction is rolled back; if all participating resource managers vote yes, the transaction is a correct transformation. In the latter case, transaction manager 120 informs each participating resource manager that the transaction is complete, and records this fact in the transaction log.

Figure 4:
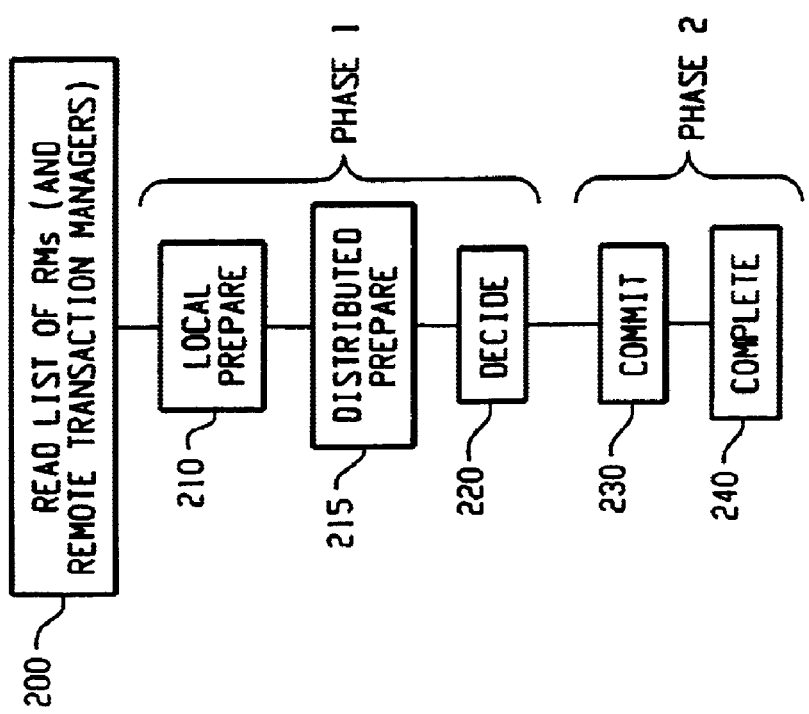
FIG. 4 illustrates the steps of the two-phase commit (2PC) protocol executed by a transaction manager when a successful Commit_Work( ) request is invoked on a transaction.

FIG. 4 illustrates the steps of the 2PC protocol executed by transaction manager 120 when a successful Commit_Work( ) is invoked on a transaction. At step 200, transaction manager 120 accesses a list, e.g., the resource manager control block list, which includes information about all participating local resource managers and transaction branches (foreign or remote transaction managers who expect a phase one prepare message) that have joined the transaction. At local prepare step 210, transaction manager 120 sends a prepare request signal to each participating local resource manager to prepare for commit. That is, transaction manager 120 asks if each local resource manager believes the transaction to be a complete and consistent transformation. At distributed prepare step 215, transaction manager 120 sends a prepare request signal on each outgoing transaction branch (a gateway process that has exported a transaction branch). That is, a prepare request is sent to each foreign transaction manager. Each foreign transaction manager is responsible for executing the 2PC protocol with any of its resource managers, and any of its exported transaction branches, that may have joined the transaction. Steps 210 and 215 may be performed separately or simultaneously as desired for optimal system performance.

At Decide step 220, if any of the participating local resource managers or any of the outgoing sessions respond no, the transaction is aborted and rolled back. If all participating local resource managers vote yes and all outgoing sessions respond yes, then the transaction writes a commit log record. When the record is durably written to disk, the transaction is logically committed. If the system fails prior to this point, the commit will have failed; if the system fails subsequent to this point, the commit step will be carried forward by restart logic. At commit step 230, transaction manager 120 sends a commit decision (i.e., a commit request signal) on each of the transaction branches and to each participating local resource manager. At complete step 240, when all participating local resource managers and all transaction branches have acknowledged the commit decision, a completion record (or forget log record) is written to the log indicating that phase two completed, and transaction manager 120 forgets about the transaction.

A resource manager either requires recovery after a failure or does not require recovery. A resource manager that requires recovery is called a recoverable resource manager. A resource manager that does not require recovery is called a non-recoverable or volatile resource manager (VRM).

Generally, volatile resources are objects in main memory, user processes maintaining transactional variables, lock managers, window managers, servers maintaining context during transaction execution, and so on. A volatile resource manager (VRM) encodes transactional semantics of a volatile resource. A VRM exports a transaction branch to the transaction manager, and participates in the agreement protocol between the transaction manager and a volatile resource. A VRM is a useful abstraction to check whether a transaction violates any integrity constraints. For example, a VRM can encode the transactional semantics of a module that checks integrity constraints. With each transaction, a VRM participates in the 2PC protocol. If a transaction satisfies all of the integrity constraints then the VRM votes to commit the transaction at phase one, otherwise it votes to abort the transaction.

Volatile participants only access volatile resources. To include a VRM in the 2PC protocol, a transaction branch is exported to the VRM. According to one embodiment of the present invention, a volatile resource can be involved in the 2PC protocol before any other resources are involved (called the pre-prepare phase). Alternatively, a VRM can participate in the 2PC protocol at the same time as the other resources.

The pre-prepare phase is useful to provide certain resource managers with extra "pre-prepare" processing prior to the commencement of commitment processing (2PC protocol). For example, according to an aspect of the present invention, the pre-prepare phase is useful to support porting a foreign database system on the local platform by writing to a file system, such as a SQL database, or to support an environment that implements resource abstractions on top of SQL files. Typically, the writes to SQL are cached for efficiency reasons. For the foreign database system to participate in the 2PC protocol with the transaction manager on the local platform a transaction branch must be exported to the VRM with the option that it participates in the pre-prepare phase. When Commit_Work( ) is called, the transaction manager first initiates the pre-prepare phase. In the pre-prepare phase, the data written by the foreign database will be first "flushed" by a resource manager. For example, the locally cached writes to SQL are flushed to disk. Once this flush is complete, the VRM sends a ready signal to the transaction manager. The transaction manager then initiates all of the resource managers to flush their audit cache on behalf of that transaction. Once the involved resource managers' flush is complete and they vote "yes", then the recoverable resource managers along with remote nodes will be involved in the 2PC protocol. In this manner, resource managers registering with the transaction manager for the pre-prepare option are signaled before commencement of phase one of the 2PC protocol. If a VRM is participating in the pre-prepare phase and it fails before it is in "ready" state (i.e., it has not voted yes for commitment of the transaction) then the transaction is aborted. If a VRM is participating in the pre-prepare phase and it fails after it is in "ready" state then this failure does not effect the outcome of the transaction.

A pre-prepare VRM can vote ready before it receives the request prepare signal. For example, this can occur if the VRM decides to flush its cache early. However, the VRM needs to be able to deal with a subsequent request prepare because the two signals may race, "passing" each other on the way to their destinations. Once pre-prepare VRM has voted ready, it cannot attempt to use the transaction handle for that transaction branch. However, if the VRM needs to do more work on the transaction, it can export the transaction again with the pre-prepare option (registering with the transaction manager that it desires pre-prepare notification) and get a new transaction handle, provided that the transaction is still active.

Figure 5:
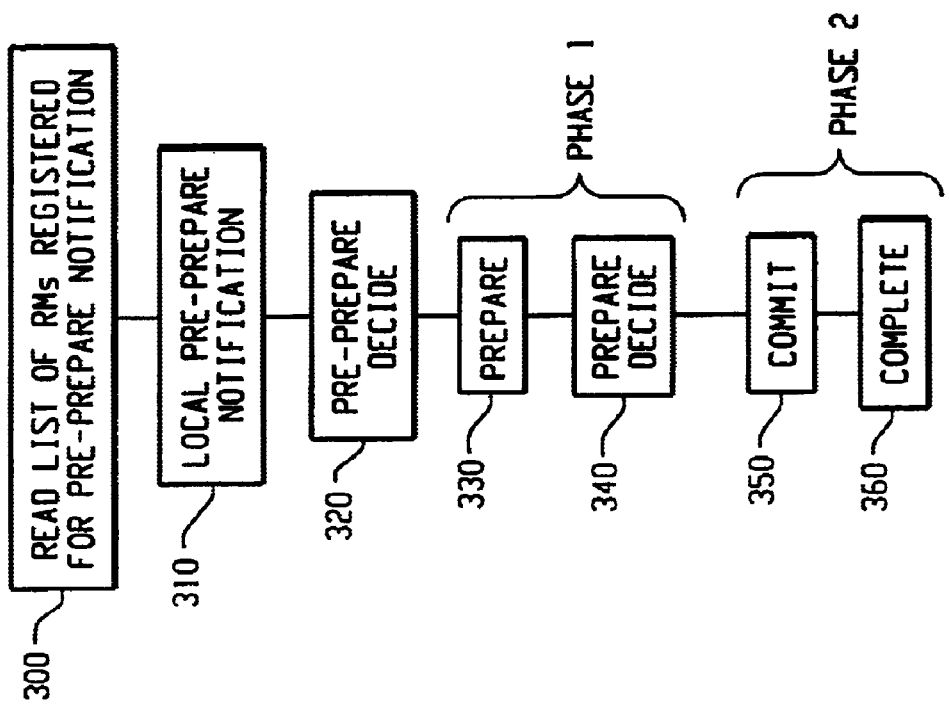
FIG. 5 illustrates the steps of the two-phase commit (2PC) protocol executed by a transaction manager when a successful Commit_Work( ) request is invoked on a transaction using resource managers registered for pre-prepare notification according to an embodiment of the present invention.

FIG. 5 illustrates the steps executed by the transaction manager when a successful Commit_Work( ) is invoked on a transaction using resource managers registered for pre-prepare notification according to an embodiment of the present invention. At step 300, the transaction manager accesses a list, e.g., the resource manager control block list, of all resource managers that have registered for pre-prepare notification for the current transaction. At step 310, the transaction manager sends a pre-prepare request signal to each local resource manager registered for pre-prepare notification. The pre-prepare request is sent to all local resource managers so registered. At local pre-prepare decide step 320, if any of the local resource managers registered for pre-prepare notification respond no during the pre-prepare phase, the transaction is aborted and rolled back. If all local resource managers registered for the pre-prepare process respond yes during the pre-prepare phase, the normal commitment processing commences. At prepare step 330, the transaction manager accesses a list of all participating local resource managers and outgoing transaction branches (foreign or remote transaction managers who expect a phase one prepare message) that have joined the transaction, and sends a prepare request signal to each participating local resource manager and on each outgoing transaction branch to prepare for commit. That is, the transaction manager asks if each local resource manager and each outgoing transaction branch believes the transaction to be a complete and consistent transformation. Each foreign transaction manager is responsible for executing the 2PC protocol with any of its resource managers, and any outgoing transaction branches, that may have joined the transaction. Also, each foreign transaction manager receiving a prepare notification signal is responsible for communicating a pre-prepare notification to any of its associated resource managers registered for pre-prepare notification, and for responding back to the transaction manager with a ready signal after all associated resource managers (including pre-prepare registered resource managers) have completed prepare processing (phase one). Thus, if a resource manager associated with the remote transaction manager that is registered for pre-prepare notification responds no during the pre-prepare phase, the transaction will be aborted and rolled back. In one embodiment, a phase one prepare signal is sent out on all transaction branches at the same time any local pre-prepare signals are issued.

At prepare decide step 340, if any of the participating local resource managers or any of the outgoing transaction branches respond no to the phase one prepare message, the transaction is aborted and rolled back. If all participating local resource managers vote yes and all outgoing transaction branches respond yes, then the transaction writes a commit log record to memory. When the record is durably written to disk, the transaction is logically committed. If the system fails prior to this point, the commit will have failed; if the system fails subsequent to this point, the commit step will be carried forward by restart logic. At commit step 350, the transaction manager sends a commit decision on each of the outgoing transaction branches and invokes each participating resource manager, telling it the commit decision. At complete step 360, when all participating local resource managers and all outgoing transaction branches have acknowledged the commit decision, a completion record (or forget log record) is written to the log indicating that phase two completed, and the transaction manager forgets about the transaction.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A transaction processing system for processing a transaction initiated by an application process, wherein one or more resource managers participate in performing one or more operations for the transaction, the system comprising:

a transaction manager TM which coordinates a commitment processing protocol for the transaction, wherein all of the participating resource managers notify the TM that they are performing an operation for the transaction and that they wish to take part in the commitment processing protocol, wherein the commitment processing protocol includes a prepare processing phase and a commit processing phase; and a volatile resource manager (VRM), communicably coupled to the TM, wherein the VRM is configured to register with the TM as a participant in the commitment processing protocol and for receiving therefrom a notification before said prepare processing phase begins;

wherein the TM issues a pre-prepare notification to the VRM and delays the prepare processing phase for the participating resource managers until the VRM issues in response to the pre-prepare notification signal a ready signal indicating whether the VRM is ready and if such ready signal is not issued the transaction is aborted and wherein if such ready signal is issued, the TM issues a prepare request signal to the VRM.

2. The system of claim 1, wherein the VRM performs one or more pre-prepare operations for the transaction after receiving the pre-prepare notification signal from the TM.

3. The system of claim 2, wherein the VRM issues the ready signal after the one or more pre-prepare operations have been completed.

4. The system of claim 2, wherein the one or more pre-prepare operations including flushing a cache.

5. The system of claim 2, wherein the VRM is a disk manager, and wherein the one or more pre-prepare operations include flushing updates to a log file.

6. The system of claim 1, wherein the VRM is located in a transaction management domain remote from the TM, the remote transaction management domain including a remote transaction manager (RTM) which coordinates the commitment processing protocol for the VRM, the system further including:

a communication resource manager (CRM) for communicably coupling the TM with the remote transaction management domain, wherein the TM issues a prepare notification signal to the RTM, wherein the RTM issues a pre-prepare notification signal to the VRM, and wherein the RTM issues the ready signal to the TM after the VRM has performed one or more pre-prepare operations and after the VRM is prepared.

7. The system of claim 6, wherein the CRM encodes the transactional semantics of the remote transaction management domain, and wherein the CRM interfaces with the remote transaction management domain over a network.

8. A method of preparing for commitment processing of a transaction initiated by an application process in a transaction processing system having a transaction manager (TM) and one or more resource managers that participate in performing one or more operations for the transaction, wherein the TM coordinates a commitment processing protocol for the transaction, wherein all of the participating resource managers notify the TM that they are performing an operation for the transaction and that they wish to take part in the commitment processing protocol, wherein the commitment processing protocol includes a prepare processing phase and a commit processing phase, and the method comprising the steps of:

issuing a request from a volatile resource manager (VRM) to the TM to register as a participant in the commitment processing protocol, indicating that the VRM is performing an operation for the transaction and that the VRM desires notification of initiation of the commitment processing protocol before said prepare processing phase begins;

issuing a pre-prepare notification signal from the TM to the VRM; and delaying the prepare processing phase for the participating resource managers, including the VRM, until the VRM issues in response to the pre-prepare notification signal a ready signal indicating whether the VRM is ready and if such ready signal is not issued the transaction is aborted, and wherein if such ready signal is issued, issuing a prepare request signal to the VRM.

9. The method of claim 8, further including the step of performing one or more pre-prepare operations for the transaction by the VRM after receiving the pre-prepare notification signal from the TM.

10. The method of claim 9, further including the step of issuing the ready signal by the VRM after the one or more pre-prepare operations have been completed.

11. The method of claim 9, wherein the one or more pre-prepare operations include flushing a cache.

12. The method of claim 9, wherein the VRM is a disk manager, and wherein the one or more pre-prepare operations include flushing updates to a log file.

13. The method of claim 8, wherein the VRM is located in a transaction management domain remote from the TM, the remote transaction management domain including a remote transaction manager (RTM) which coordinates the commitment processing protocol for the VRM, wherein a communication resource manager (CRM) communicably couples the TM with the remote transaction management domain, and wherein the TM issues a prepare notification signal to the RTM, the method further including the steps of:

issuing a pre-prepare notification from the RTM to the VRM; and issuing the ready signal to the TM from the RTM after the VRM has performed one or more pre-prepare operations and the after the VRM is prepared.

14. A method of preparing for commitment processing of a transaction initiated by an application process in a transaction processing system having a transaction manager (TM) and one or more resource managers that participate in performing one or more operations for the transaction, wherein the TM coordinates a commitment processing protocol for the transaction, wherein all of the participating resource managers notify the TM that they are performing an operation for the transaction and that they wish to take part in the commitment processing protocol, wherein the commitment processing protocol includes a prepare processing phase and a commit processing phase, the method comprising the steps of:

issuing a request from a volatile resource manager (VRM) to the TM to register as a participant in the commitment processing protocol, indicating that the VRM is performing an operation for the transaction and that the VRM desires notification before said prepare processing phase begins;

issuing a pre-prepare notification signal from the TM to the VRM, wherein the VRM performs one or more pre-prepare operations after receiving the pre-prepare notification signal;

issuing a first ready signal from the VRM after the VRM has completed the one or more pre-prepare operations indicating whether the VRM is ready and if such first ready signal is not issued the transaction is aborted; and if the transaction is not aborted, prior to commencing the prepare processing phase of the commitment processing protocol issuing a second ready signal from the VRM to the TM.

15. The method of claim 14, wherein the commitment processing protocol is the two-phase commit (2PC) protocol.

16. The method of claim 14 wherein pre-prepare operations are performed using a transaction handle, and wherein the one or more pre-prepare operations include flushing a cache and wherein the VRM is prohibited from using the transaction handle after issuing the second ready signal.

17. The method of claim 14, wherein the VRM is a disk manager, and wherein the one or more pre-prepare operations include flushing updates to a log file.

18. A method of preparing for commitment processing of a transaction initiated by an application process in a transaction processing system having a transaction manager (TM) and one or more resource managers that participate in performing one or more operations for the transaction, wherein the TM coordinates a commitment processing protocol for the transaction, wherein all of the participating resource managers notify the TM that they are performing an operation for the transaction and that they wish to take part in the commitment processing protocol, wherein the commitment processing protocol includes a prepare processing phase and a commit processing phase, the method comprising the steps of:

issuing a request from a volatile resource manager (VRM) to the TM to register as a participant in the commitment processing protocol, indicating that the VRM is performing an operation for the transaction and that the VRM desires notification before said prepare processing phase begins, wherein the VRM is located in a transaction management domain remote from the TM, the remote transaction management domain including a remote transaction manager (RTM) which coordinates the commitment processing protocol for the VRM, wherein a communication resource manager (CRM) communicably couples the TM with the remote transaction management domain;

issuing a first prepare notification signal from the TM to the RTM;

issuing a pre-prepare notification signal from the RTM to the VRM; and delaying the prepare processing phase for the VRM, until the VRM issues in response to the pre-prepare notification signal a ready signal indicating whether the VRM is ready and if such ready signal is not issued the transaction should be aborted, and wherein if such ready signal is issued, issuing a prepare request signal to the participating VRM.

19. The method of claim 18, further comprising the step of issuing the ready signal from the VRM to the RTM after the VRM has performed one or more pre-prepare operations.

20. The method of claim 19, further comprising the step of issuing a second prepare notification signal from the RTM to the VRM after the VRM has issued the ready signal.

21. The method of claim 20, further comprising the step of issuing a prepare ready signal from the RTM to the TM after the VRM has indicated it is prepared.

22. A transaction processing system for processing a transaction initiated by an application process, comprising:

a resource manager configured to participate in the transaction by performing one or more operations for the transaction;

a transaction manager (TM) configured to coordinate a commit protocol for the transaction, wherein the participating resource manager is further configured to register with the TM as a participant in the commit protocol by notifying the TM that it wishes to take part in the commit protocol, wherein the commit protocol includes prepare and commit phases;

a volatile resource; and a volatile resource manager (VRM) having access to the volatile resource and being communicably coupled to the TM, wherein the VRM is configured to register with the TM for receiving therefrom a notice in advance of the prepare phase;

wherein the TM issues a pre-prepare notification to the VRM and delays the prepare phase for the participating resource managers until the VRM issues in response to the pre-prepare notification signal a ready signal indicating whether the VRM is ready and if such ready signal is not issued the transaction is aborted and wherein if such ready signal is issued, the TM issues a prepare request signal to the VRM.

23. A transaction processing system as recited in claim 22, wherein the volatile resource manager is further configured to be reliant on the participating resource manager for a pre-prepare processing phase.

24. A transaction processing system as recited in claim 22, wherein the volatile resource manager is configured for encoding transactional semantics of the volatile resource.

25. A transaction processing system as recited in claim 22, wherein the volatile resource is a user process, a lock manager, a window manager or a server maintaining context during execution of the transaction.

26. A transaction processing system as recited in claim 22, wherein the volatile resource is an object in the main memory.

27. A transaction processing system as recited in claim 22, wherein the TM is operating on a local platform and the pre-prepare process is used for porting a foreign database system on the local platform.

28. A transaction processing system as recited in claim 22, wherein the pre-prepare phase is used for porting a foreign database system, and wherein data written by the foreign database system is flushed.

29. A transaction processing as recited in claim 22, further comprising a CRM configured to export and import transaction branches allowing remote transaction managers to participate in the commitment processing protocol with the TM.

* * * * *